Feb. 10, 1970   KENZO MORITA   3,494,694
AUTOMATIC FOCUSING APPARATUS FOR USE IN
OPTICAL IMAGE PROJECTOR
Filed Aug. 1, 1967   2 Sheets-Sheet 1

INVENTOR.
KENZO MORITA
ATTORNEY

INVENTOR
KENZO MORITA
ATTORNEY

United States Patent Office 3,494,694
Patented Feb. 10, 1970

3,494,694
AUTOMATIC FOCUSING APPARATUS FOR USE IN OPTICAL IMAGE PROJECTOR
Kenzo Morita, Tokyo-to, Japan, assignor to Cabin Kogyo Kabushiki Kaisha, Tokyo-to, Japan
Filed Aug. 1, 1967, Ser. No. 657,600
Claims priority, application Japan, Aug. 9, 1966, 41/52,211
Int. Cl. G03b 3/100
U.S. Cl. 353—101         1 Claim

ABSTRACT OF THE DISCLOSURE

Invariable correct focuring of the images carried by sildes projected from an optical image projector is effected by the arrangement comprising an auxiliary light source unit disposed on one side of the optical axis of the projection light and light receiving means disposed on the other side, said means including a photoelectric element adapted to receive the light of said light source reflected from the face of a slide exposed to a projection light and a vibrating slit plate disposed in front of said element, and that any dislocation of said slide from normal position is derived as a change in the output of said element and that this output is applied to an electric control circuit adapted to drive a reversible D.C. motor by which the projection lens, the auxiliary light source unit and the light receiving means are accordingly displaced as one unit.

BACKGROUND OF THE INVENTION

Field of the invention

The present invention relates to optical image projector, and more particularly to an improved photographic slide projector having an objective or projection lens which is adapted to focus a projected image of a slide on a screen or the like.

Description of the prior art

In conventional slide projectors, the adjustment of the focus of the projected images has been carried out by the operator in such manner that the operator projects a first slide on a screen or the like and, while watching the image projected on the screen, he moves the objective or the projection lens back and forth until the image is clearly focused on the screen, or in such fashion that the operator controls, at a distance, a means adapted to make reverse rotation and being coupled to the projection lens unit, and that, after the focus has been obtained, the operator introduces slides one after another into the path of the light from the projection light to project the images one after another. In view of the fact, however, that the focal length which has been set as described above is based on the position of the slide first placed in the optical axis of the projection light, there arised, in the conventional projectors, the inconveniences that, if the position of one slide which is subsequently placed in the optical axis of the projection light is displaced in any appreciable amount from the position of the first inserted slide, the focusing of said one slide required to be adjusted in a manner as for the first slide, and such adjustment of the focus had to be done each time when there occurred a displacement of the position of the slide placed in the slide holding frame. In fact, the mount which carries the slide film in it has a thickness which varies with each individual mount.

Moreover, the grooves provided in the slide holding frame of the projector in which the slide film is held in place during the projection is given a relatively loose width or allowance to permit the slide to be smoothly brought into the optical axis of the projection light through said grooves. Therefore, the slide can move in the grooves slightly back and forth in the direction of the optical axis of the projection light. This means that the slide is not always placed correctly in the grooves for each insertion. Moreover, in case any particular slide film is projected for an extended length of time, the film face will become curved due to the excessive heat reecived from the light source, and as a result, the position of the film slide will become displaced substantially from the positioned initially determined.

Thus, the operator will be required to adjust the focus of the projected image of the slide for each insertion or to adjust the focus in accordance with the degree of the curving of the film face during the projection of an extended length of time, after the focus has been initially set. Such adjustment of focus has been a task which is quite troublesome and inconvenient for the operator.

In order to alleviate this inconvenience which was associated with the projecting operation, there have been proposed various apparatuses so designed as to detect this slight dislocation of the slide or the slight curving of the slide to thereby effect a slight amount of movement of the projection lens or the slide holder to automatically readjust the focusing and to thereby maintain the maximum clarity of the image projected on the screen for each insertion. These prior apparatuses, however, had the shortcomings that the degree of precision of the detected positional dislocation of the slide and the degree of the precision of the response of the adjusting means to the detection were relatively too low to successfully attain the aimed purpose.

SUMMARY OF THE INVENTION

It is, therefore, an object of the present invention to provide an improved automatic focusing apparatus for use in optical image projectors which eliminates the aforesaid shortcomings and inconveniences of the slide projectors of the prior art by the arrangement that the position of the slide inserted in the optical axis of the projection light, or in other words, the dislocation of the slide relative to the optical axis, is photoelectrically detected, that the projection lens unit is automatically displaced by a motor or like means in accordance with the detected amount of dislocation of the position of the slide, and that after the focus is set by the operator, the adjustment of the focus is automatically effected whenever the face of the slide film becomes dislocated from the predetermined position due to the allowance in the widths of the grooves of the slide holding frame and even when the face of the slide film becomes curved due to the heat received continuously from the light source, whereby eliminating the shortcomings of the slide projectors of the prior art.

Another object of the present invention is to provide an optical image projector comprising an automatic focusing means having high reliability and increased durability.

Other objects and advantages of the present invention will become apparent by reading the following description in conjunction with the accompanying drawings.

DESCRIPTION OF THE PREFERRED EMBODIMENT

Figure 1:
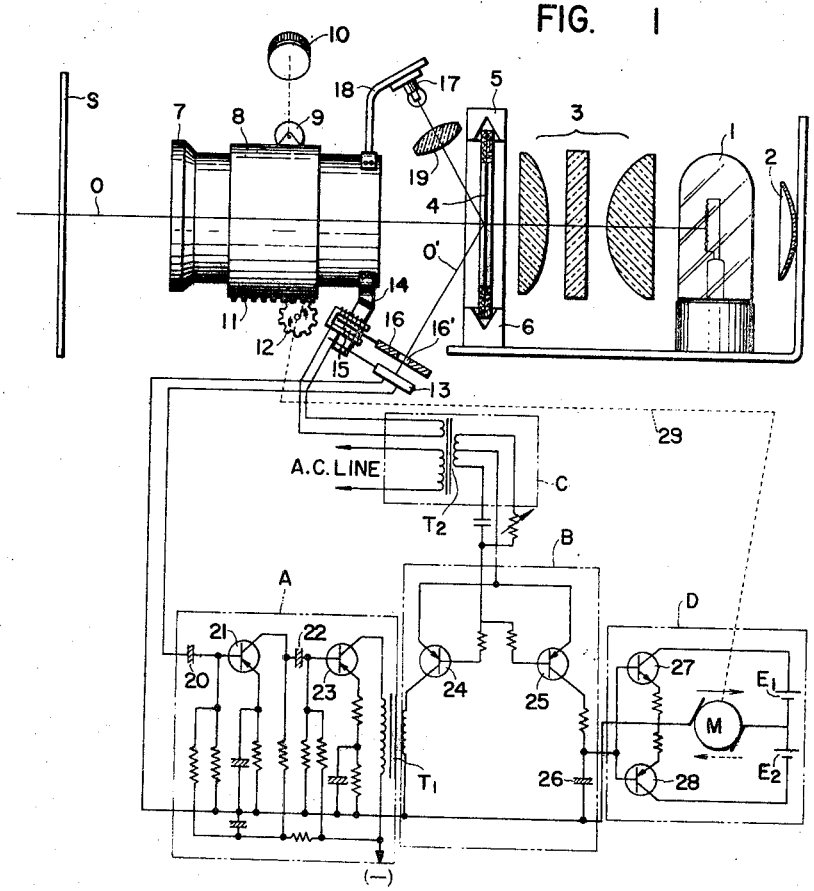
FIG. 1 is a diagrammatic representation of an automatic focusing arrangement according to the present invention including one example of electric control circuit.
Figure 2:
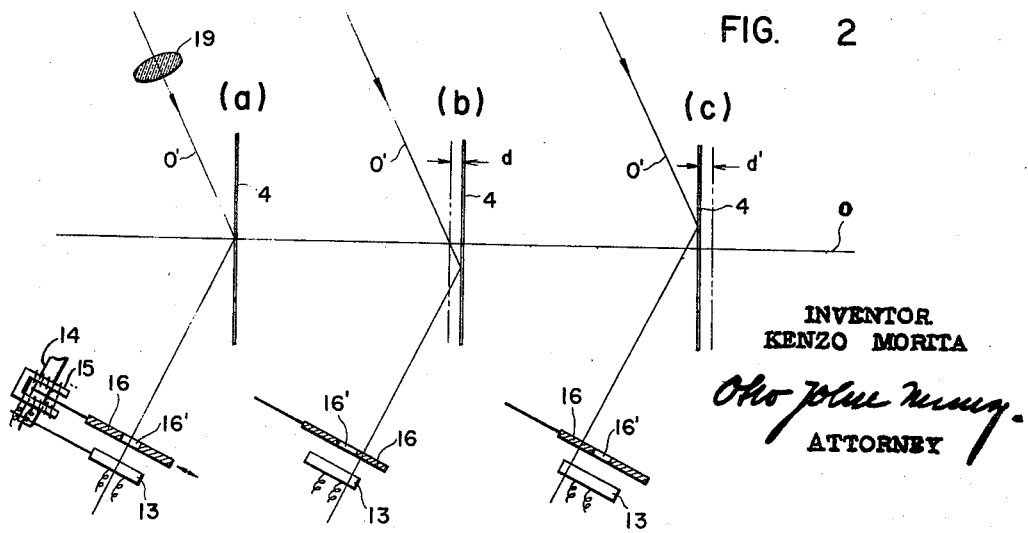
FIG. 2 is a schematic representation intended for the explanation of the actions of the essential portions of said focusing arrangement.

Referring to FIGS. 1 and 2, reference numeral 1 represents a projection lamp which is associated with the reflector 2 to direct light generally down an optical axis identified by solid line O. Reference numeral 3 represents generally a condensing lens unit comprising two convex lenses and a filter or heat-glass to illuminate the slide 4 positioned in a pair of stationary slide guides 5 and 6. The illuminated slide 4 is then focused on a screen S or the like by means of a movable objective lens 7 which is movably held in a holder 8 which carries a friction wheel 9 which is connected to a manual focus knob 10. Said knob 10 is adapted to move the objective lens 7 within its holder 8. Said knob 10 is shown as being manually operable to focus the objective lens 7. In fact, this focus-adjusting means might be a remote control, e.g. a switch which is effective to cause the rotation of the friction wheel 9 by the energization of a reversible electric motor (not shown). The holder 8 includes a gear rack 11 which meshes with a gear 12 to cause the movement of the holder 8 and of the objective lens 7, as one unit, along the optical axis O under the control of a reversible D.C. motor M, said motor being controlled in a manner to be described later. It is the intention that the objective lens 7, the slide guides 5 and 6, condensing lens unit 3, the lamp 1 and the reflector 2 be representative showings of the conventional components to be found in optical image projectors.

For the purpose of simplicity, these components have been shown somewhat diagrammatically. It is further intended that the operation of this projector may be manual, semi-automatic or automatic.

As will be readily appreciated, the stationary slide guides 5 and 6 define a generally vertical plane which is generally perpendicular to the optical axis O at which the slide 4 is adapted to be positioned. Reference numeral 13 represents a photoelectric element which is disposed behind a slit plate 16 adapted to make reciprocal movement in a plane perpendicular to the optical axis O' of an auxiliary light by a solenoid vibrator 15. Said photoelectric element 13, said slit plate 16 and said solenoid vibrator 15 are constructed as one unit with the objective lens 7 by means of a supporting arm 14.

Numeral 17 represents an auxiilary lamp which is constructed as one unit with the objective lens 7 by means of a supporting arm 18 and which is disposed at a position substantially symmetrically on the other side of the optical axis O relative to said slit plate 16.

Said auxiliary lamp 17 is arranged in such fashion that the light radiated from this auxiilary lamp 17 is focused by a lens 19 and that the optical axis of this focused light is projected so as to be directed at the point of intersection of the slide 4 and the optical axis O of the projection light when said slide 4 is placed in its normal position as shown in FIG. 1 and also that the light reflected from the slide 4 is allowed to pass through the center of the slit 16' formed in the slit plate 16 and further to impinge onto the photoelectric element 13. More specifically, the arrangement of the slit plate 16, the photoelectric element 13, the auxiliary lamp 17 and the slide guides 5 and 6 are arranged so that, when the slide 4 is in its normal position as shown in FIGS. 1 and 2(a), the photoelectric element 13 always receives a predetermined amount of light from the auxiliary lamp 17 during one cycle of oscillatory movement of the slit plate 16.

Accordingly, in case the slide 4 is displaced from its normal position shown by broken line in (b) in FIG. 2 to a position which is closer by a distance d as shown in (b) in FIG. 2 toward the projection lamp 1, the light from the auxiliary lamp 17 is shielded by the portion of the slit plate 16 other than the portion of the slit 16' during one half of the oscillatory movement of the slit plate 16 in which this slit plate is pulled into the recessed portion of the solenoid vibrator 15. As a result, hardly any light rays enter into the photoelectric element 13 during this period. In case the slide 4 is displaced from its normal position by a distance d' as shown in (c) in FIG. 2 in the direction opposite to the aforesaid direction, hardly any light rays from the auxiliary lamp 17 will enter into the photoelectric element 13 during the one half of the cycle of oscillation of the slit plate 16, in which the latter plate is pushed outside from the recess of the solenoid vibrator 15, in a similar manner as has been described above. Accordingly, in the event that the slide 4 is placed in the positions as shown in (a), (b) and (c) in FIG. 2 respectively, the wave-form of the output of the photoelectric element 13 will assume the patterns as shown in (a), (b) and (c) in FIG. 5, respectively. More specifically, in case the slide 4 is placed in a position shown in (a) in FIG. 2, there is generated a substantially constant output in the photoelectric element 13, while in case the slide 4 is placed in the positions shown in (b) and (c) in FIG. 2, there will be generated an output only after the completion of said half cycle. These two patterns of outputs are of phases which are different from each other by 180°.

Reference character A in FIG. 1 represents in general an A.C. amplifier comprising transistors 21 and 23 and capacitors 20 and 22 and this A.C. amplifier is adapted to amplify the alternate outputs of the photoelectric element 13.

Reference character B represents a phase discriminator comprising transistors 24 and 25 and a capacitor 26 and connected, through a transformer $T_1$, to the A.C. amplifier A. Reference character C represents an A.C. voltage supply source consisting of a transformer $T_2$ comprising a primary coil connected to the A.C. line, a secondary coil connected to the energizing coil of the solenoid vibrator 15 and another secondary coil connected to the base terminals and the emitter terminals of the transistors 24 and 25 for supplying a reference A.C. voltage to the phase discriminator B. Reference character D represents a power amplifier comprising transistors 27 and 28 and D.C. sources $E_1$ and $E_2$, with the common base terminals of the transistors 27 and 28 being connected to the collector terminal of the transistor 25, while a coil for energizing a D.C. reversible motor M adapted to directly or indirectly drive a gear 12 as shown by the broken line 29 is connected, through said power sources $E_1$ and $E_2$, between the common emitter terminals and the respective collector terminals of these transistors.

Figure 3:
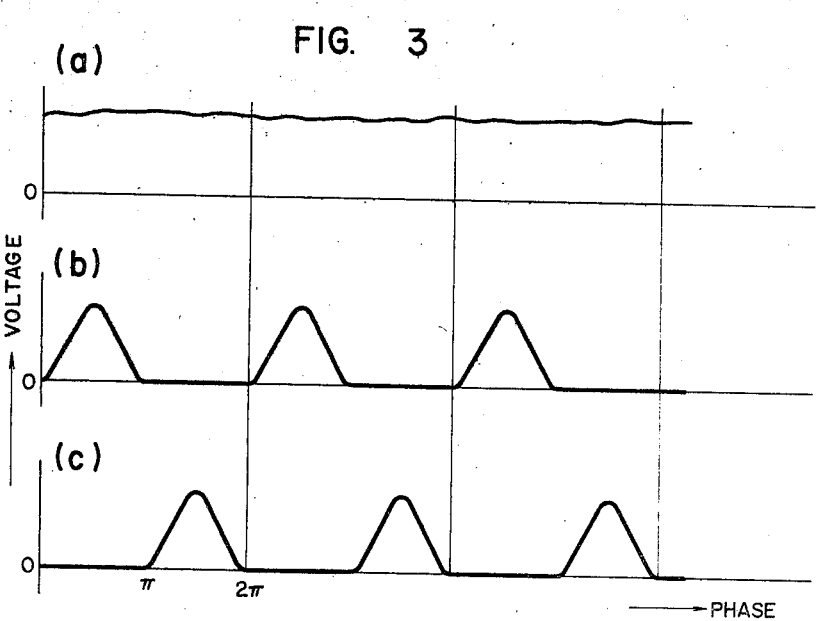
FIG. 3 is a diagram showing the output wave-forms of the light receiving unit of the aforesaid focusing arrangement according to the present invention.
Figure 4:
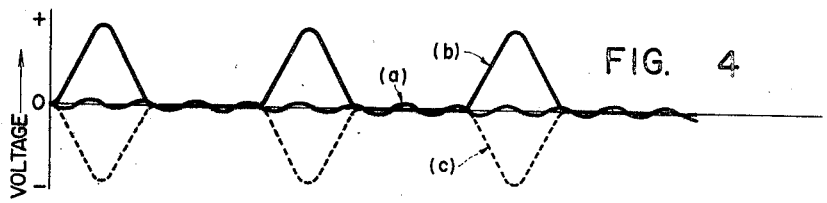
FIG. 4 is a diagram showing the output wave-forms for phase discrimination appearing in the control circuit used in the aforesaid focusing arrangement.

Accordingly, it will be clearly understood that, if the three kinds of outputs as shown in (a), (b) and (c) of FIG. 3 which are generated in the photoelectric element 13 are applied, together with the reference voltage, to the phase discriminator B, the output of this phase discriminator will be shaped into those patterns as shown in (a), (b) and (c) of FIG. 4, respectively. Specifically, the pattern of (b) in FIG. 4 represents one which appears when the phase difference relative to the reference voltage is nil, while the pattern (c) in FIG. 4 is one which is produced where there is a difference of 180° in phase as compared with the reference voltage.

Description will hereunder be directed to the function of the apparatus of the present invention.

The projection lens 7 is so arranged that it is displaced, as an integral unit with the solenoid vibrator 15 and with the slit plate 16, as the gear wheel 12 is rotated, and that the projection lens alone is displaced independently when the knob 10 is rotated. Therefore, when the slide 4 is inserted in the slide guides so as to be in register with the optical axis O of the projection light, the operator is required first to correct the focus of the image projected on the screen S by displacing only the projection lens 7 back and forth by manually operating the knob 10, and next to actuate the automatic focusing means of the present invention. More specifically, when the circuit shown in FIG. 1 is actuated by means of an appropriate switch means not shown, the auxiliary lamp 17 is lighted up and at the same time the slit plate 16 begins vibration by virtue of the action of the solenoid vibrator 15. Assuming now that the slide 4 is held in the normal position by the guides 5 and 6, the output of the photoelectric element 13 will show a pattern as indicated by (a) in FIG. 3, and this output is applied to the A.C. amplifier A which is formed with transistors 21 and 23. However, the D.C. component will be cut off by he capacitors 20 and 22. Accordingly, the output which is applied, through the phase discriminator B comprising transistors 24 and 25 and through the rectifying smoothing condenser 26, to the power amplifier D comprising transistors 27 and 28 and adapted to drive the motor is reduced only to a small amount of the A.C. component which is contained in said output. This applied output component is, as shown in (a) in FIG. 5, almost equal to nil. Accordingly, the aforesaid power amplifier D is not actuated and the motor M remains to be in rest. As a result, the projection lens 7 is held in the position which has been already set manually, and thus, the image projected onto the screen S is maintained in the focused state. When, on the other hand, the face of the slide becomes curved from the aforesaid state, or when the slide film which is subsequently inserted in the guides is dislocated slightly toward the projection lamp 1 from its normal position (a) in FIG. 2, the output of the photoelectric element 13 will become as shown in (b) in FIG. 3 for the reasons as stated previously. This output will, after being applied to amplifier A, be applied, together with the reference voltage from the reference voltage source C, to the phase discriminator B to be shaped into the wave-form as shown in (b) in FIG. 4, and is further flattened by the smoothing condenser 26 to be rectified into a positive D.C. output as shown at (b) in FIG. 5. Thus, this positive output is applied to the common base terminals of the transistors 27 and 28 which constitute the power amplifier D, with a result that the transistor 27 is rendered to "on" state, while the transistor 28 is rendered to "off" state, and that a current in the direction shown by the solid arrow passes through the motor M which, as a result, is rotated in such direction as will allow the projection lens 7 together with the solenoid vibrator 15 and the auxiliary lamp 17 to be displaced toward the pojection lamp 1 or, in other words, from the position shown in FIG. 1 towards the right. In case, however, the path of light of the auxiliary lamp 17 which irradiates the face of the slide 4 gradually moves in parallel with the initial path of light as this auxiliary lamp 17 is displaced, and when, as a result, the axis O' of the light of said auxiliary lamp 17 reflected from the plane of the slide 4 becomes in agreement with the axis of the reflected light which is obtained when the auxiliary lamp 17 and the slide 4 are in their normal position, the output of the photoelectric element 13 will assume the pattern indicated at (a) in FIG. 3.

Accordingly, for the reasons already described, the power amplifier D for driving the motor will be rendered to the resting state, with the result that the motor M is caused to stop right at this position. Thus, the projection lens 7, which has been moving due to the rotation of the motor M towards the projection lamp 1 together with the auxiliary lamp 17 as one unit, stops at a position where the focus has been adjusted for the distance of the dislocation of the slide 4 from its normal position toward the projection lamp 1.

Figure 5:
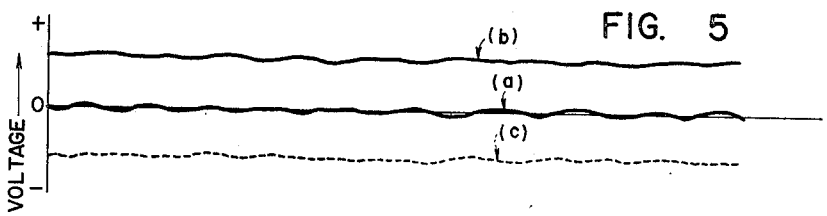
FIG. 5 is a diagram showing the rectified output wave-forms in said control circuit.

In the event that the focus of the projection lens 7 is dislocated because of the displacement of the slide 4 from its normal position to a point closer to the screen S and assumes the state as shown in (c) in FIG. 2 for the reasons as have been previously described, the output of the photoelectric element 13 will become as shown at (c) in FIG. 3, and accordingly the output applied to the common base terminals of the transistors 27 and 28 of the power amplifier D for driving the motor will become as indicated at (c) in FIG. 5.

As a result, the transistor 27 will be rendered to "off" state, while the transistor 28 will be rendered to "on" state. Accordingly, a current in the direction as indicated by the broken arrow will flow through the motor M which will then be rotated in such direction as will cause the projection lens 7 as well as the solenoid vibrator 15 and the auxiliary lamp 17 as one unit to move toward the screen S or, in other words, from the position of FIG. 1 toward the left.

However, as the axis O' of the light of the auxiliary lamp 17 which irradiates the face of the slide 4 gradually moves in a parallel direction with its initial path of light and becomes in agreement with the axis of the light reflected from the face of the slide 4 which is obtained when the slide 4 is in its normal position, the motor M will stop at this corresponding position in the manner as has been described previously. Thus, the projection lens 7 which has been moving toward the screen S by virtue of the rotation of the motor M will stop at a position where the focus of the projected image has been adjusted for the distance covered by the slide 4 dislocated from its normal position toward the screen S.

Figure 6:
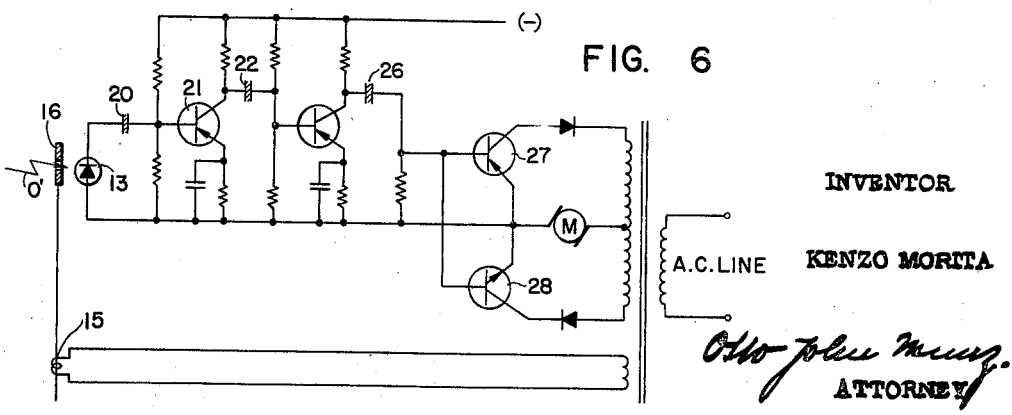
FIG. 6 is a diagrammatic representation of another example of the electric control circuit shown in FIG. 1.

FIG. 6 shows another embodiment of the electrical control circuit shown in FIG. 1. The control circuit of this embodiment is featured in that it is simplified as compared with the control circuit shown in FIG. 1. More specifically, in this embodiment of FIG. 6, the number of the transistors is reduced to only one, and moreover, in lieu of the D.C. power sources $E_1$ and $E_2$ of the power amplifier D in FIG. 1, a D.C. current is obtained in this embodiment from an A.C. power source through a rectifier. It is to be understood that the like parts of the circuit of FIG. 6 are indicated by like reference numerals used in FIG. 1.

In the foregoing embodiments, the slit plate 16 is oscillated by means of a solenoid vibrator 15. It should be understood that, instead of the aforesaid arrangement, this slit plate 16 may be stationary and that the photoelectric element 13 may be caused to make reciprocal movement in a plane perpendicular to the optical axis O' of the auxiliary lamp 17. Also, instead of effecting the displacement of the projection lens 7 by means of the motor M, the motor may be coupled to the slide holding frame to thereby effect the displacement of the slide 4. It should be also understood that the present invention is not limited only to these embodiments which have been described and illustrated simply by way of examples, and that various modifications of the apparatus of the present invention may be made without departing from the spirit of the invention by those skilled in the art.

What is claimed is:

1. An automatic focusing apparatus for use in optical image projectors, comprising a projection lamp, a condenser lens unit, guiding means for holding a slide in place in the optical axis of said projection lamp, a movable objective lens unit adapted to move to focus a projected image carried by said slide on a screen or the like, an auxiliary light source unit mounted on said objective lens unit for irradiating the face of said slide held in place in the optical axis of said projection lamp, a light receiving means mounted on said objective lens unit and comprising a stationary photoelectric element and a light shielding plate provided with a slit which reciprocates in a plane perpendicular to the optical axis of the light of said auxiliary light source reflected from the face of said slide, an electric control means comprising an energizing circuit for oscillating said shielding plate in a predetermined cycle, a phase discriminating circuit for discriminating the phase of the alternate outputs of said photoelectric element, a power amplifying circuit for controlling the direction of the rotation of an A.C. reversible motor in accordance with the output of said phase discriminating circuit, and means for effecting the displacement of said objective lens unit by the rotation of said motor, said apparatus being arranged in such fashion that said light shielding plate is disposed so as to allow said reflected light to pass through the center of said slit and that thereby said objective lens unit is displaced so as to compensate for any change occurring in the position of said slide when said slide is dislocated from its normal position, whereby maintaining the distance between said objective lens and said slide constant.

References Cited

UNITED STATES PATENTS

| | | | |
|---|---|---|---|
| 3,037,423 | 6/1962 | Shurcliff | 353—101 |
| 3,249,006 | 5/1966 | Stauffer | 353—101 |
| 3,264,935 | 8/1966 | Vose | 353—101 |
| 3,349,667 | 10/1967 | Levin et al. | 353—101 |

HARRY N. HAROIAN, Primary Examiner

U.S. Cl. X.R.

352—140; 353—69, 76